(12) United States Patent
Braun et al.

(10) Patent No.: US 9,560,840 B2
(45) Date of Patent: Feb. 7, 2017

(54) FISHING LINE REEL WITH RAPID LINE PAYOUT

(71) Applicant: AMS Bowfishing, LLC., Stratford, WI (US)

(72) Inventors: Jeff Braun, Stratford, WI (US); Tim Morines, Colby, WI (US)

(73) Assignee: AMS, LLC, Stratford, WI (US)

(*) Notice: Subject to any disclaimer, the term of this patent is extended or adjusted under 35 U.S.C. 154(b) by 293 days.

(21) Appl. No.: 14/270,817

(22) Filed: May 6, 2014

(65) Prior Publication Data

US 2014/0332615 A1 Nov. 13, 2014

Related U.S. Application Data

(60) Provisional application No. 61/820,297, filed on May 7, 2013.

(51) Int. Cl.
*A01K 89/01* (2006.01)

(52) U.S. Cl.
CPC ....... *A01K 89/0108* (2013.01); *A01K 89/0102* (2013.01)

(58) Field of Classification Search
CPC ................ A01K 89/01; A01K 89/0102; A01K 89/01025; A01K 89/01026; A01K 89/01029; A01K 89/01087
See application file for complete search history.

(56) References Cited

U.S. PATENT DOCUMENTS

| 2,903,201 | A | | 9/1959 | Sarah | |
|---|---|---|---|---|---|
| 2,911,165 | A | | 11/1959 | Sarah | |
| 3,123,319 | A | * | 3/1964 | Hull | A01K 89/0102 242/247 |
| 3,325,115 | A | | 6/1967 | Sarah | |
| 3,327,963 | A | * | 6/1967 | Sarah | A01K 89/0102 242/236 |
| 3,771,740 | A | * | 11/1973 | Nepote | A01K 89/0102 242/240 |
| 3,970,263 | A | * | 7/1976 | Hull | A01K 89/0102 242/236 |
| 4,156,510 | A | * | 5/1979 | Hull | A01K 89/0102 242/240 |
| 4,180,217 | A | * | 12/1979 | Harre | A01K 89/0102 242/239 |
| 4,383,516 | A | | 5/1983 | LaSee | |
| 4,722,491 | A | * | 2/1988 | Myojo | A01K 89/0102 242/141 |
| 4,760,974 | A | * | 8/1988 | Swisher | A01K 89/0102 242/240 |
| 5,697,566 | A | * | 12/1997 | Young | A01K 89/0275 242/239 |
| 5,918,827 | A | * | 7/1999 | Pulliam | A01K 89/0102 242/314 |

(Continued)

*Primary Examiner* — Emmanuel M Marcelo
(74) *Attorney, Agent, or Firm* — Boyle Fredrickson, S.C.

(57) ABSTRACT

A reel for fishing line or the like provides for extremely rapid payout by releasing the line to unwind by sliding rapidly around a guide surrounding the line spool and by rotation of the line spool itself. A lever controls a line guide preventing sliding of the fishing line around the guide and providing controllable friction and locking of rotation of the line spool only when actuated by the user to permit retraction of the line or controlled tensioning of the line.

19 Claims, 5 Drawing Sheets

(56) References Cited

U.S. PATENT DOCUMENTS

| | | | |
|---|---|---|---|
| 6,375,107 B1 * | 4/2002 | Wong | A01K 89/0102 |
| | | | 242/240 |
| 6,634,350 B2 | 10/2003 | LaSee | |
| 6,796,522 B2 | 9/2004 | Braun | |
| 7,290,727 B1 * | 11/2007 | Matsuda | A01K 89/0117 |
| | | | 242/238 |
| 2012/0285430 A1 | 11/2012 | Dunlop et al. | |

* cited by examiner

FISHING LINE REEL WITH RAPID LINE PAYOUT

CROSS REFERENCE TO RELATED APPLICATION

This application claims the benefit of U.S. Provisional Application 61/820,297 filed May 7, 2013 and hereby incorporated by reference.

BACKGROUND OF THE INVENTION

The present invention relates to a reel for winding and storing fishing line or the like and more particularly to a reel that provides rapid payout of the fishing line, for example, as required when the reel is used for bow fishing.

In bow fishing, an arrow is fitted with a lightweight but sturdy line which may pay out behind the arrow when the arrow is shot from a bow. The line allows the arrow and/or arrow and fish, to be retrieved after the shot.

It is important that the line be stored without tangling before release of the arrow and yet be able to pay out rapidly with little resistance when the arrow is released. Conventional reels which rotate to wind or unwind line present substantial rotational inertia that can interfere with free flight of the arrow.

These problems of line storage and release are addressed in a novel bow fishing reel described in U.S. Pat. No. 4,383,516, assigned to the assignee of the present invention, in which the line is loosely coiled in a bottle. After the line is pulled from the bottle by the arrow, opposed rubber rollers at the mouth of the bottle clamp together about the line and push it into the bottle under the urging of a geared crank handle. The line is stored without winding in a loose mass within the bottle that nevertheless resists tangling.

An alternative to the above design can be found in conventional spin casting reels, for example, the type described in U.S. Pat. No. 6,375,107, in which the axis of the spool about which the line is wound is parallel to the direction that the line pays out after arrow release, which are sometimes used for bow fishing. As the line pays out, the line slips over the edge of the reel unwinding without rotation of the reel or the need to overcome a corresponding rotational inertia of the reel. The line is returned to the reel by a bail arm or similar device orbiting the reel as driven by a crank arm. The bail arm catches the line to wrap it around the reel without reel rotation. Such spin casting reels may be attached to cantilevered anus extending forward from the bow riser. Before drawing the bow and releasing the arrow, the user uses his or her free hand to press a thumb button on the rear of the reel to release the bail arm or fold the bail arm back.

SUMMARY OF THE INVENTION

The present invention provides a fishing line reel that improves upon conventional spin casting reels in a number of ways, particularly when used for bow fishing. First, the reel may default to a state allowing rapid line release rather than requiring conscious release of a line guide used for winding. In this way, the user cannot forget to release the line guide before releasing the drawn arrow avoiding the possibility that the line will break or the arrow may stretch the line and recoil, or the reel may be damaged.

Spooling line back on the reel may be initiated by a trigger lever spring biased to the line releasing state but readily actuated by fingers of the same hand supporting, the bow. Motion of the lever may smoothly vary the amount of resistance to the line unspooling or may lock the line spool against rotation.

During unspooling, both the line spool on which the line is wound may rotate and the line guide may be retracted. This dual-action improves the smooth unspooling of fishing line during high-speed payout of fishing line at arrow flight speeds.

In one embodiment, the invention provides a fishing line reel including a housing that supports a crank mechanism operable by a user for rotating a first shaft extending along an axis with respect to the housing. The housing holds a line spool that can rotate about the first shaft. A winder rotates with the first shaft using a line guide for catching a fishing line so that the fishing line winds about the line spool with rotation of the first shaft when the line guide is in an extended position. On the other hand, when the line guide is in a retracted position, it frees the fishing line so that the fishing line does not wind about the line spool with the rotation of the first shaft. A lever mechanism is positioned to be operable by the user to move the line guide from the retracted position to the extended position when the lever moves between a released position and an actuated position and a bias spring biases the lever mechanism to move the line guide to the released position.

It is thus a feature of at least one embodiment of the invention to provide a fishing line reel that defaults to a line release position reducing the chance of arrow recoil or damage if the user fails to remember to release a bail arm prior to the shooting arrow.

It is another feature of at least one embodiment of the mention to provide for dual-action release in which the line is both released from the line guide and the line spool allowed to rotate to permit high-speed payout of the fishing line. While the inventors do not wish to be bound to a particular theory, it is believed that the dual-action reduces twisting that may cause line fouling.

The fishing line reel may include a friction clutch positioned between the line spool and the housing for applying increasing frictional restraint to rotation of the line spool with respect to the housing with increased movement of the lever from the release position to the actuated position. Generally, the frictional restraint may vary smoothly with continuous movement of the lever from the released position to the actuated position and a substantially constant friction may be obtained at each lever position. It is thus a feature of at least one embodiment of the invention to provide a user controllable frictional line restraint that may be controllably varied during a catch rather than requiring presetting by the user.

The friction clutch may be a wave washer.

It is thus a feature of at least one embodiment of the invention to provide a compact and simple friction element that also provides a desired spring biasing.

The fishing line reel may further include a dog clutch positioned between the line spool and the housing creating interference restraint to rotation of the line spool with respect to the housing with movement of the lever toward the actuated position after an increasing frictional restraint by the friction clutch.

It is thus a feature of at least one embodiment of the invention to allow the user to lock the line spool against rotation again by simple lever action of the same lever that controls frictional engagement.

The dog clutch may provide a set of inter engaging teeth between the housing and the line spool.

It is thus a feature of at least one embodiment of the invention to provide a compact spool locking mechanism using portions of the housing and line spool.

The winder may provide a fishing line deflector positioned coaxially about the first shaft and presenting a peripheral surface allowing the line to freely slide circumferentially about the axis along the fishing line deflector when the line guide is in the retracted position.

It is thus a feature of at least one embodiment of the invention to promote rapid line payout when the line guide is disengaged from the line.

The line guide may be a pin extending toward the rear and parallel to the first axis in the extended position and retracting forwardly parallel to the first axis in the retracted position.

It is thus a feature of at least one embodiment of the invention to provide a robust line guide that may be simply operated by a tension-controlling lever.

The fishing line reel may further include a cover fitting over the winder and line spool and providing a front opening centered about the axis for receiving the fishing line along the axis.

It is thus a feature of at least one embodiment of the invention to provide a guide to the fishing line promoting fast payout and reducing line fouling.

The winder may provide a circular fishing line deflector providing a radially symmetric outer surface guiding fishing line from the opening around the circular fishing line deflector to the line spool.

It is thus a feature of at least one embodiment of the invention to promote an even payout of the fishing line.

The line guide may be a pin extending toward the rear and parallel to the first axis from the fishing line deflector in the extended position and retracting within the fishing line deflector in the retracted position.

It is thus a feature of at least one embodiment of the invention to orient the line guide for engagement with simple axial motion.

The circular fishing line deflector is attached to the first shaft via a sliding key allowing translational movement without rotational movement of the fishing line deflector with respect to the first shaft and the lever may communicate via connecting bar through a hollow bore in the first shaft to a compression cap pressing the circular fishing line deflector toward the line spool.

It is thus a feature of at least one embodiment of the invention to permit simultaneous control of the line guide and frictional or locking of the line spool with a simple compressive force applied by the lever.

The fishing line reel may further include at least one rolling element thrust bearing positioned between the compression cap and the fishing line deflector. It is thus a feature of at least one embodiment of the invention to permit independent control of the line spool restraining force (through the frictional clutch) and the line guide restraining force (through the crank), for example, to permit locking or tensioning of the line spool when the fishing line is being retracted under control of the crank and possibly against the force of the fish.

The circular fishing line deflector may provide a first and second axially displaced portion wherein the line guide is fixed to a frontmost portion and extends through the rearmost portion, with separation between the frontmost portion and rearmost portion moving the line guide between the extended position and the retracted position.

It is thus a feature of at least one embodiment of the invention to provide a two-part fishing line deflector that may robustly support the line guide.

The line spool may provide a central hub about which the line is wound having a greater diameter toward the opening in the cover through which the string exits and a lesser diameter away from the opening.

It is thus a feature of at least one embodiment of the invention to control the exit direction of the line to ensure smooth payout.

The lever may extend along a direction perpendicular to the axis.

It is thus a feature of at least one embodiment of the invention to position the lever for ready access by the fingers of a bow-fisher's hand supporting the bow during use of the bow.

The crank mechanism may include a right angle drive so that an axis of rotation of the crank mechanism by the user is perpendicular to the first axis and perpendicular to the extent of the lever.

It is thus a feature of at least one embodiment of the invention to permit operation of the crank mechanism by a bow-fisher's free hand without release of the bow grip.

The fishing line reel may include a mounting bracket attached to the housing and providing a clamp adapted to attach to a portion of a bow riser, the mounting bracket orienting the housing with the axis extending in a direction of arrow travel from the bow and allowing the housing to be moved vertically and horizontally with respect to the bow riser.

It is thus a feature of at least one embodiment of the invention to provide a simple method of attaching the fishing line reel to different bows.

The mounting bracket may attach the housing substantially abutting a side of a bow riser.

It is thus a feature of at least one embodiment of the invention to minimize torque on the bow grip when force is applied to the fishing line while permitting the controls of the lever and crank to be conveniently located near the bow-fisher's hand.

The crank mechanism may include a one-way drive allowing the application of torque to the crank mechanism in only a single direction by the crank.

It is thus a feature of at least one embodiment of the invention to promote a winding of the fishing line on the spool in a consistent direction such as promotes consistent and rapid payout.

The line spool includes a hole extending through the hub for tying the line to the hub.

It is thus a feature of at least one embodiment of the invention to permit convenient tie-off of the fishing line in a manner that prevents the fishing line from sliding around the spool during winding.

These particular objects and advantages may apply to only some embodiments falling within the claims and thus do not define the scope of the invention.

DETAILED DESCRIPTION OF THE PREFERRED EMBODIMENT

Figure 1:
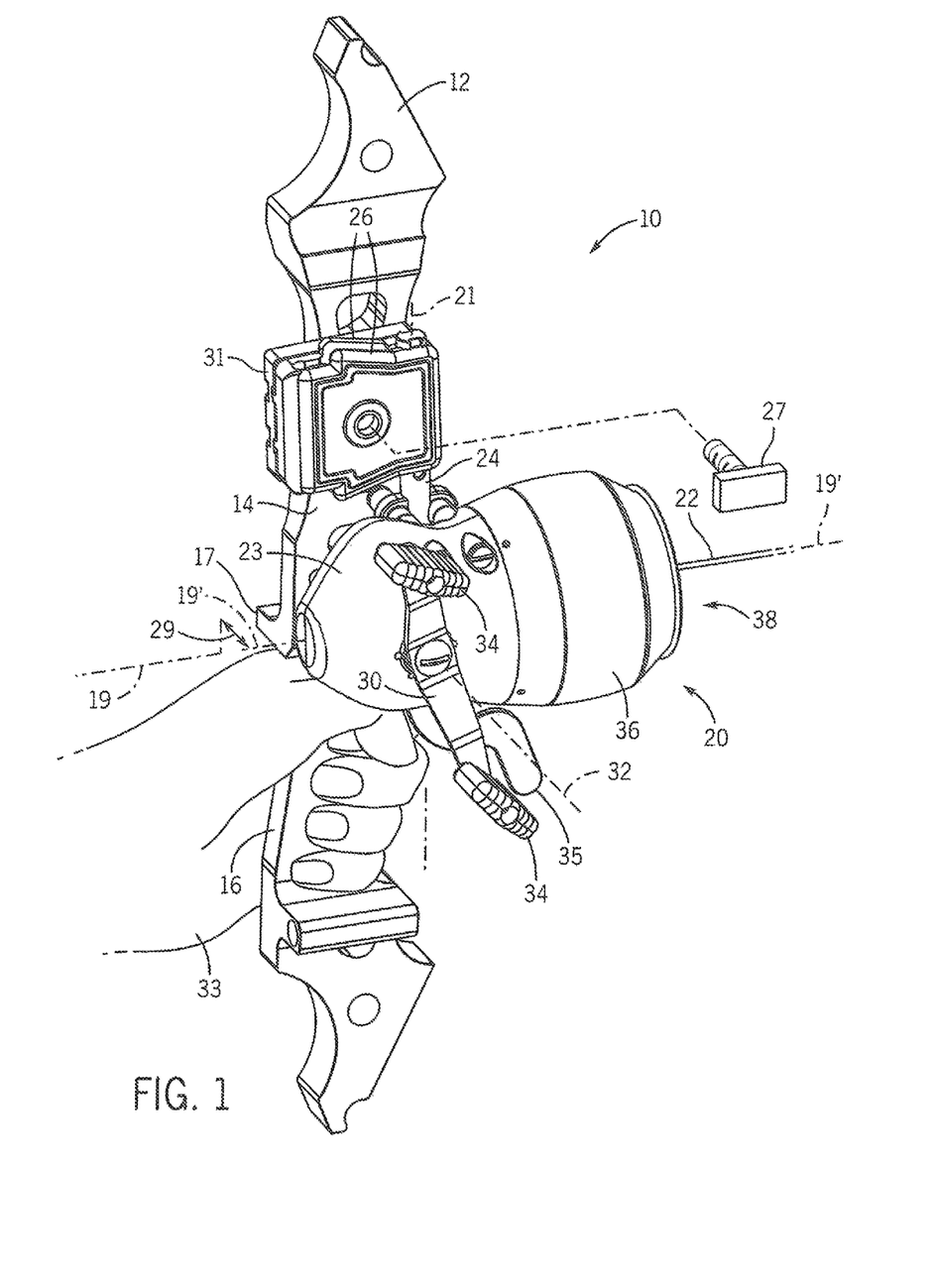
FIG. 1 is a fragmentary perspective view of a bow riser portion of a bow having the reel of the present invention attached thereto.

Referring now to FIG. 1, a bow fishing bow 10 may include a bow frame 12 presenting a bow riser 14 providing a grip 16 for gripping by the user's bow hand 33. The bow riser 14 may provide an arrow shelf 17 above the grip 16 for supporting the arrow shaft (not shown) before release of the arrow for travel generally along axis 19.

A fishing line reel 20 for storing and paying out fishing line 22 may be attached to the bow riser 14 above the grip 16 to substantially abut the bow riser 14 to one side of the bow riser 14. The fishing line 22 used in this capacity may be, for example, a braided rather than monofilament line, for example a braided Dacron roughly 1/32 inches in diameter or smaller ranging from 50 pound test to 150 pound test that may be readily distinguished from, for example, fly casting line, by its greater strength and substantially greater outer diameter.

The fishing line reel 20 may have a reel housing 23 attached to a vertically extending slide 24, the latter received by clamp jaws 26. The clamp jaws 26 may be held by a base mount 31 which may be attached to the riser 14 by one or more bolts (not shown) passing through the base mount 31 into standard threaded sight holes on the riser 14. The base mount 31 has a horizontal slot (not shown) holding a captive nut so that the clamp jaws 26 may be attached to the base mount 31 by a T-bolt 27 and be adjustable horizontally forward and backward along axis 19'.

In use, the slide 24 may be adjusted vertically along an axis 21 substantially perpendicular to axis 19 within the clamp jaws 26 and horizontally along axis 19 by sliding the base mount 31 and horizontally. After vertical & horizontal positioning is obtained the clamp jaws 26 may be tightened together by tightening T-bolt 27 preventing further movement of the slide 24 with respect to the clamp jaws 26 while also firmly attaching the clamp jaws 26 to the riser 14 via the base 31. The reel housing 23 is positioned to allow the fishing line 22 extending along an axis 19' parallel to axis 19 to be vertically aligned with axis 19. Generally the axis 19' of the fishing line 22 will be separated horizontally with respect to the axis 19 by displacement distance 29 of less than substantially three inches and preferably less than two inches, significantly limiting torque on the grip 16 when tension is applied to the fishing line 22. A lower end of spool control lever 35 extends out of the reel housing 23 and downward from the housing 23 along but not necessarily aligned with the vertical axis 21 so as to be easily operated by fingers of a hand 33 of the user holding the grip 16. When not operated by the user, the control lever 35 will be in a forward released position as shown.

A double handled crank arm 30 may extend from a side of the housing 23 to be operated by the user to rotate a crankshaft (not shown in FIG. 1) about axis 32 perpendicular to axis 19 and axis 21. The crank arm 30 may include rotating grips 34 on each end as is generally understood in the art.

In normal use, a reel cover 36 may attach to the housing 23 to protect and cover an internal winding mechanism (to be discussed below) and to provide a frontward guide opening 38 restraining the exit path of the fishing line 22 along the axis 19'.

Figure 2:
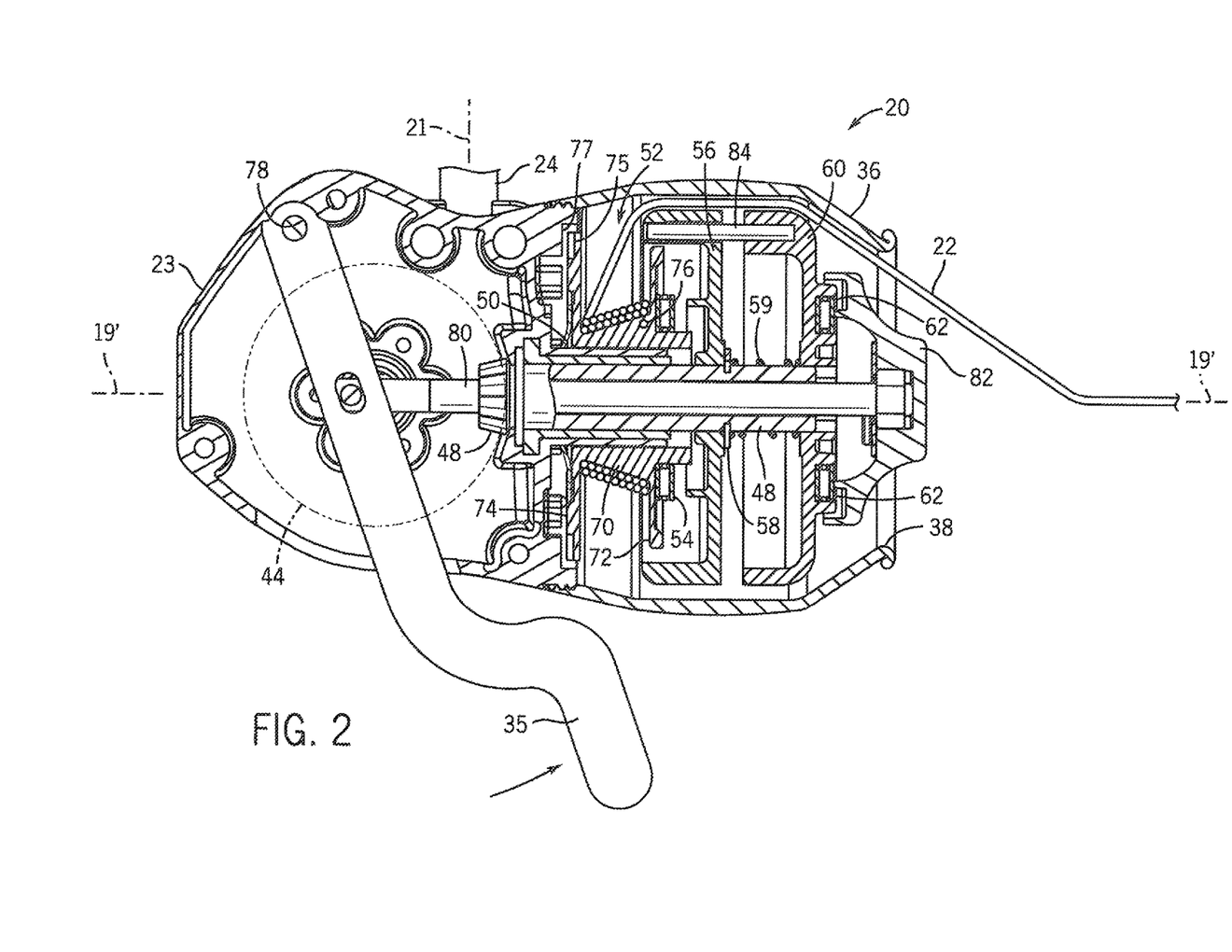
FIG. 2 is a side elevational cross-section of the reel of FIG. 1 showing positioning of the control lever forward in the released position so that line guide used for winding line around the line spool is retracted and the line spool is free to rotate.
Figure 4:
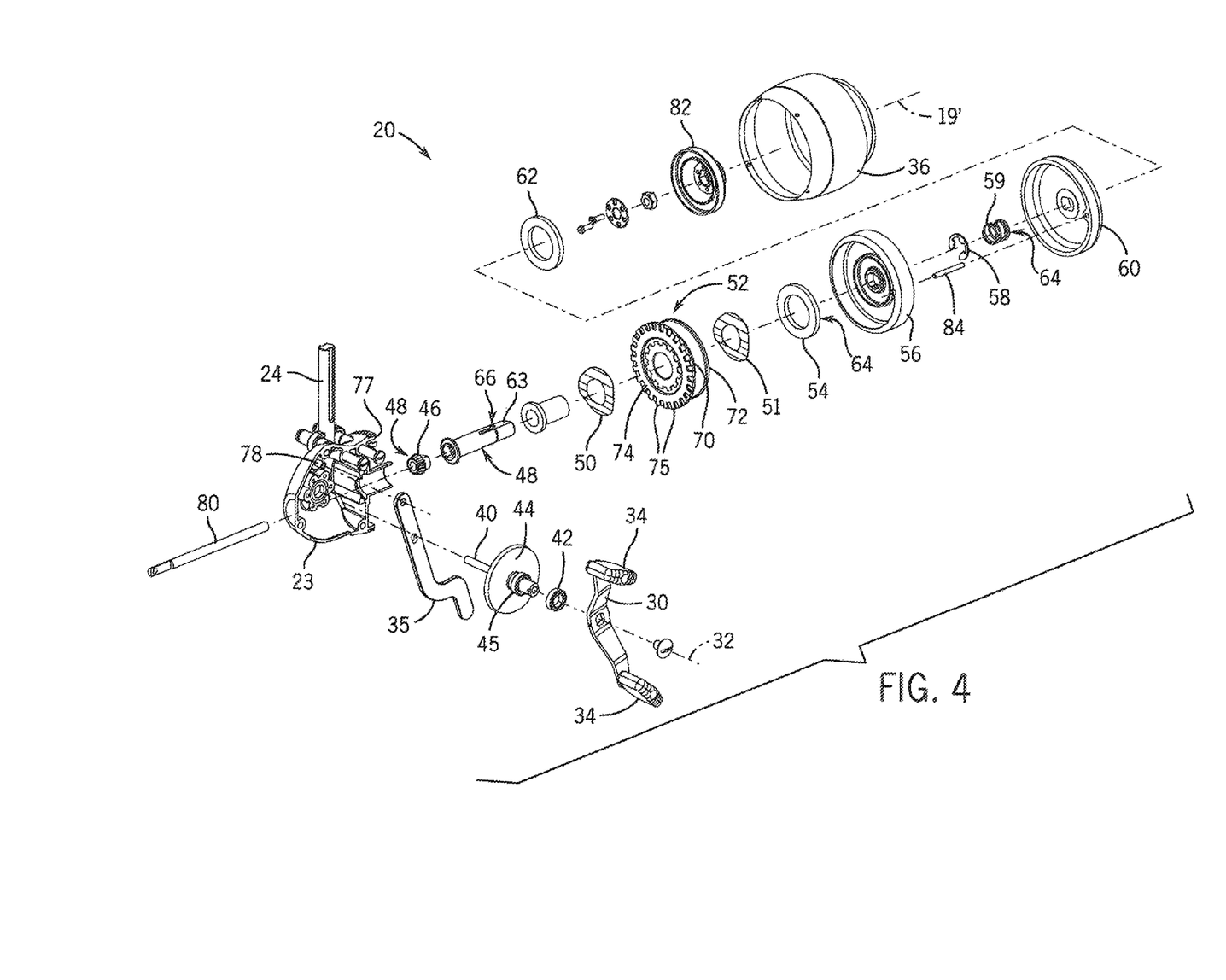
FIG. 4 is a fragmentary exploded view of the mechanism of the reel of FIG. 1 showing operation of the control lever to extend or retract the line guide within a fishing line deflector and showing positioning of wave washer used to provide a controlled friction clutch and engagement tabs providing a dog clutch between the housing and the line spool.

Referring now to FIGS. 2 and 4, as noted above, the crank arm 30 may attach to a crankshaft 40 extending along axis 32 through a support ball bearing 42 held in a right side portion of the housing 23 (not shown) After passing through a ratchet mechanism 45 or similar one-way clutch allowing only clockwise force to be applied to the crankshaft 40 by the crank arm 30, the crankshaft 40 may attach to bevel gear 44 The bevel gear 44 may engage with and drive a smaller pinion gear 46 attached to a driveshaft 48, the latter extending generally along axis 19', to rotate the driveshaft 48 with rotation of the crank arm 30 with a step up in rotational rate caused by the gear ratio between bevel gear 44 and smaller pinion gear 46.

The driveshaft 48 extends forward from and out of the housing 23 to pass progressively through a wave washer spring 50, a fishing line spool 52 having an internal bushing, a needle bearing 54, a second wave washer 51, a rear fishing line deflector 56, an E-clip 58, a compression spring-59, and a front fishing line deflector 60. A key surface 63 (or other spline-type sliding attachment) on the driveshaft 48 is received by corresponding key surfaces 64 on the rear and front fishing line deflectors 56 and 60 so that the rear and front fishing line deflectors 56 and 60 rotate with the driveshaft 48 but are free to slide within a limited range axially along axis 19' with respect to the driveshaft 48. The E-clip 58 attaches to a notch 66 in the driveshaft 48 to restrain forward axial movement of the rear fishing line deflector 56; however, the front fishing line deflector 60 is not so constrained by the E-clip 58.

Each of the front fishing line deflector 60 and rear fishing line deflector 56 provide substantially smooth circular outer peripheries that may allow the fishing line 22 to slide helically around axis 19' when paying off of the fishing line spool 52 as will be described below.

The fishing line spool 52 has a generally frustoconical hub 70 tapering to a larger diameter from rear to front (toward the guide opening 38) and flanked by front and rear radially extending rims 72 and 74 which serve to retain coiled fishing line 22 on the hub 70. The front edge of the hub 70 may include a hole 76 passing generally parallel to a tangent line of the outer periphery of the hub 70 that allows the fishing line 22 to be tied positively to the hub 70 without slipping with rotation of the fishing line spool 52.

The rear rim 74 may include teeth 75 that may engage corresponding teeth 77 on a front edge of the housing 23 when wave washer spring 50 is fully compressed which allows the rim 74 to move rearward as will be discussed.

The lever 35 may attach inside the housing 23 at its upper end at a fulcrum point 78 so that the lever 35 may pivot thereabout. In addition the lever 35 may pivotally attach at a point were it crosses axis 19' to a through shaft 80 that passes forward through a hollow bore extending axially through the driveshaft 48 along axis 19'. The through shaft 80 may thus slide smoothly through the hollow bore of the driveshaft 48 with movement of the lever 35 and without interference with rotation of the driveshaft 48. An end of the through shaft 80 extending through the driveshaft 48 may be attached to an end cap 82 which may press against the front surface of the front fishing line deflector 60 through a thrust needle bearing 62 so as to provide compressive force along axis 19' without constraining the rotation of the front fishing line deflector 60 when the lever 35 is pulled back.

A line guide pin 84 is embedded in the front fishing line deflector 60 to extend from a rear of the periphery of the front fishing line deflector 60 generally parallel to axis 19 but displaced therefrom. The line guide pin 84 may be received within a loose aligned bore formed in the rear fishing line deflector 56 to slide there through.

The action of the wave washer spring 50 and compression spring 59 serves to move the lever to the forward released position when it is not pressed by the user. In this released position, the end cap 82 may move freely forward under the influence of the spring bias of compression spring 59 and wave washer spring 50 as urged by the intervening structure of the line spool 52 and the rear and front fishing line deflectors 56 and 60. Compression spring 59 separates the rear fishing line deflector 56 from the front fishing line deflector 60 pulling the line guide pin 84 fully within the rear fishing line deflector 56 so that it may not interfere with a sliding of the fishing line 22 around the smooth, radially symmetrical outer peripheries of the line guides 56 and 60 during an unspooling operation. In addition wave washer spring 50 separates the teeth 77 and 75 of the housing 23 and rear rims 74 so that the line spool 52 may freely rotate. It will be understood therefore that paying out of the fishing line 22 is facilitated both by the ability of the fishing line 22 to pass freely around the fishing line deflectors 56 and 60 in an unwrapping process and rotation of the fishing line spool 52.

Figure 3:
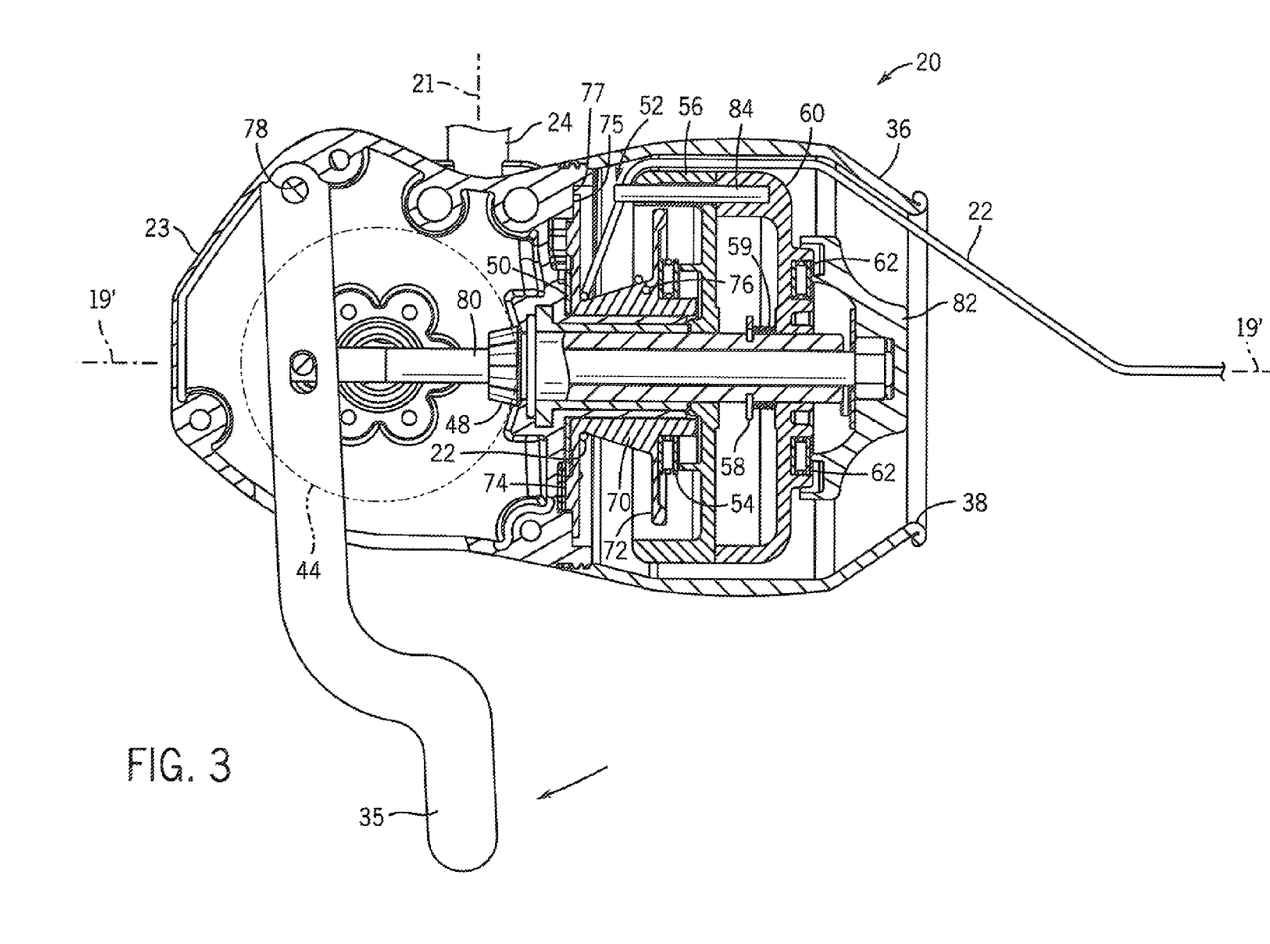
FIG. 3 is a figure similar to that of FIG. 2 showing positioning of the control lever rearward in the actuated position so that line guide used for winding line around the line spool is extended for engaging the fishing line and the line spool is locked against rotation.

Referring now to FIGS. 3 and 4, with rearward motion of the lever 35, the through shaft 80 is pulled backward pulling end cap 82 against the front fishing line deflector 60 and pulling the rear rim 74 of the fishing line spool 52 toward the housing 23. Free rotation of the fishing line deflectors 56 and 60 under compression is ensured by needle bearings 62 and 54; however, the compression causes increased friction between the fishing line spool 52 and the housing 23 with increased compression of the wave washer spring 50 such as it increases both the contact area between the wave washer spring 50 and these flanking surfaces and the force of contact. In this way the wave washer spring 50 provides part of a friction clutch.

Figure 5:
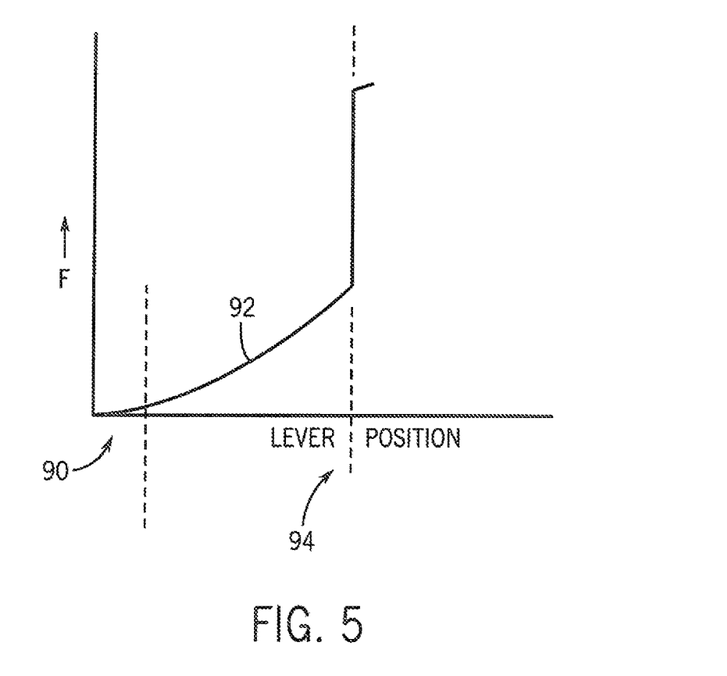
FIG. 5 is a plot of frictional force restraining the line spool against rotation as a function of the control lever position between a release and an actuation point.

Referring now momentarily also to FIG. 5, generally the frictional force between the line spool 52 and the housing 23 when the lever 35 is in the released position 90 shown in FIG. 2 will be substantially zero as ensured by the roller bearings 54 and 62. With drawing back of the lever 35 by the user, pulling the lever 35 rearward, increased force of compression on wave washer spring 50 causes a smooth increase in frictional force in region 92. When the lever is fully pulled back to an actuation point 94, the teeth 75 of the rim 74 may engage teeth 77 of the housing 23 to provide a dog clutch positively locking the two together and providing substantially infinite rotational resistance up to the point of breakage. It will be noted that the actual control of the tension of the fishing line 22 will be a function both of restraint of the line spool 52 and prevention of rotation of the rear and front fishing line deflectors 56, the latter effected through the user control of the crank arm 30.

Referring still to FIGS. 3 and 4, retraction of the lever 35 rearward to the actuation position also provides an extension of the line guide pin 84 from a rear surface of the rear fishing line deflector 56 so that it may catch the fishing line 22 and, with rotation driven by the crank arm 30, wrap the fishing line 22 around the fishing line spool 52 which is now held in a locked position.

During use, an arrow slide on an arrow (not shown but as depicted in U.S. Pat. No. 6,517,453 hereby incorporated by reference) will be attached to a free end of the fishing line 22 and engage with the bowstring, for example, held by the user's right hand (assuming a right handed user and bow) while the user's left hand holds the grip 16 as shown in FIG. 1. The user's fingers will be free of the lever 35 and thus when the arrow is released the fishing line 22 will be able to pay out at rapid speed. For retrieval of the arrow and fishing line 22, the user may simply extend the fingers of the hand 33 holding the bow to engage the lever 35 and pull it back into a frictional or locking engagement. The user's right hand will then be able to operate the crank arm 30. By simultaneous control of the crank arm 30 and the lever 35 tensioning, retraction of the fishing line may be flexibly controlled.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than, those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A fishing line reel providing rapid line payout comprising:
   a housing supporting:
   a crank mechanism operable by a user for rotating a crankshaft extending along a first axis and rotating a drive shaft extending along a second axis with respect to the housing substantially perpendicular to the first axis;
   a line spool rotatable about the drive shaft;

a winder attached to rotate with the drive shaft and having a pin movable with respect to the rotatable winder for catching a fishing line so that the fishing line winds about the line spool with rotation of the drive shaft when the pin is in an extended position extending from the winder and for freeing the fishing line so that the fishing line does not wind about the line spool with the rotation of the drive shaft when the pin is in a retracted position retracted into the winder;

an operator operable by the user to move the pin from the retracted position to the extended position when the operator moves between a released position and an actuated position; and a bias spring biasing the operator to move the pin to the retracted position wherein the pin extends in a rearward direction parallel to the second axis in the extended position and retracting forwardly parallel to the second axis in the retracted position.

2. The fishing line red of claim 1 further including a friction clutch positioned between the line spool and the housing for applying increasing frictional restraint to rotation of the line spool with respect to the housing with increased movement of the operator from the released position to the actuated position.

3. The fishing line reel of claim 2 wherein the frictional restraint varies smoothly with continuous movement of the operator from the released position to the actuated position and provides substantially constant frictional restraint at each operator position.

4. The fishing line reel of claim 3 wherein the friction clutch includes a wave washer.

5. The fishing line reel of claim 2 further including a dog clutch positioned between the line spool and the housing creating interference restraint to rotation of the line spool with respect to the housing with movement of the operator toward the actuated position after an increasing frictional restraint by the friction clutch.

6. The fishing line reel of claim 5 wherein the dog clutch provides a set of interengaging teeth between the housing and the line spool.

7. The fishing line reel of claim 1 further including a cover fitting over the winder and line spool and providing a front opening centered about the second axis for receiving the fishing line along the second axis.

8. The fishing line reel of claim 7 wherein the line spool is in front of the crank mechanism along the second axis and the winder is in front of the line spool along the second axis and the opening in the cover is in front of the winder.

9. The fishing line reel of claim 8 wherein the winder provides a circular fishing line deflector providing a radially symmetric outer surface guiding fishing line from the opening around the circular fishing line deflector to the line spool.

10. The fishing line reel of claim 9 wherein the circular fishing line deflector is attached to the drive shaft via a sliding key allowing translational movement without rotational movement of the circular fishing line deflector with respect to the drive shaft and wherein the operator communicates via a connecting bar through a hollow bore in the drive shaft to a compression cap pressing the circular fishing line deflector toward the line spool.

11. The fishing line reel of claim 10 further including at least one rolling element thrust bearing separating the fishing line deflector from a stationary structure.

12. The fishing line reel of claim 9 wherein the line spool provides a central hub about which the line is wound having a greater diameter toward the opening and a lesser diameter away from the opening.

13. The fishing line reel of claim 1 further including a mounting bracket supporting a bow displaced from the housing along the first axis.

14. The fishing line reel of claim 13 wherein the operator is a lever extending from the housing along a third axis substantially perpendicular to the first and second axes and the crank mechanism includes a right angle drive so that an axis of rotation of the crank mechanism by the user is perpendicular to the second axis and perpendicular to an extent of the lever.

15. The fishing line reel of claim 1 further including a mounting bracket adapted to attach to the housing substantially abutting a side of a bow riser.

16. The fishing line reel of claim 1 wherein the line spool includes a hole extending through a hub of the line spool for tying the line to the hub.

17. A fishing line reel providing rapid line payout comprising;
a housing supporting:
a crank mechanism operable by a user for rotating a crankshaft extending along a first axis and rotating a drive shaft extending along a second axis with respect to the housing substantially perpendicular to the first axis;
a line spool rotatable about the drive shaft;
a winder attached to rotate with the drive shaft and having a pin movable with respect to the rotatable winder for catching a fishing line so that the fishing line winds about the line spool with rotation of the drive shaft when the pin is in an extended position extending from the winder and for freeing the fishing line so that the fishing line does not wind about the line spool with the rotation of the drive shaft when the pin is in a retracted position retracted into the winder;
an operator operable by the user to move the pin from the retracted position to the extended position when the operator moves between a released position and an actuated position; and
a bias spring biasing the operator to move the pin in the retracted position
wherein the winder provides a fishing line deflector positioned coaxially about the drive shaft and presents a peripheral surface allowing the line to freely slide circumferentially about the second axis along the fishing line deflector when the pin is in the retracted position; and
wherein the fishing line deflector provides a first and second portion displaced along the second axis wherein the pin is fixed to a frontmost portion and extends through a rearmost portion, with separation between the frontmost portion and rearmost portion moving the pin between the extended position and the retracted position.

18. A fishing line reel providing rapid line payout comprising:
a housing supporting:
a crank mechanism operable by a user for rotating a crankshaft extending along a first axis and rotating a drive shaft extending along a second axis with respect to the housing substantially perpendicular to the first axis;
a line spool rotatable about the drive shaft;

a winder attached to rotate with the drive shaft and having a pin movable with respect to the rotatable winder for catching a fishing line so that the fishing line winds about the line spool with rotation of the drive shaft when the pin is in an extended position extending from the winder and for freeing the fishing line so that the fishing line does not wind about the line spool with the rotation of the drive shaft when the pin is in a retracted position retracted into the winder;

an operator operable by the user to move the pin from the retracted position to the extended position when the operator moves between a released position and an actuated position;

a bias spring biasing the operator to move the pin to the retracted position; and a mounting bracket attached to the housing and providing a clamp adapted to attach to a portion of a bow riser, the mounting bracket orienting the housing with the second axis extending in a direction of arrow travel from the bow to be adjustably moved vertically and horizontally.

19. The fishing line reel of claim 18 wherein the mounting bracket provides a releasable slide adjusting a distance between the clamp and the housing to position the operator near the bow grip for operation by a bow gripping hand.

* * * * *

UNITED STATES PATENT AND TRADEMARK OFFICE
CERTIFICATE OF CORRECTION

PATENT NO. : 9,560,840 B2
APPLICATION NO. : 14/270817
DATED : February 7, 2017
INVENTOR(S) : Jeff Braun et al.

It is certified that error appears in the above-identified patent and that said Letters Patent is hereby corrected as shown below:

In the Claims

Claim 2, Column 9, Line 21:
Delete "red" and insert therefor --reel--

Signed and Sealed this
Twenty-seventh Day of March, 2018

Andrei Iancu
*Director of the United States Patent and Trademark Office*